United States Patent
Neff et al.

(10) Patent No.: US 7,210,501 B2
(45) Date of Patent: May 1, 2007

(54) DIRECTLY OPERATED PNEUMATIC VALVE HAVING A DIFFERENTIAL ASSIST RETURN

(75) Inventors: Robert H Neff, Bloomfield Village, MI (US); Eric P Janssen, Howell, MI (US); Lynn R Long, Walled Lake, MI (US)

(73) Assignee: Mac Valves, Inc., Wixom, MI (US)

( * ) Notice: Subject to any disclaimer, the term of this patent is extended or adjusted under 35 U.S.C. 154(b) by 437 days.

(21) Appl. No.: 10/953,701

(22) Filed: Sep. 29, 2004

(65) Prior Publication Data

US 2006/0065315 A1 Mar. 30, 2006

(51) Int. Cl.
F15B 13/044 (2006.01)
F16K 39/02 (2006.01)

(52) U.S. Cl. .................... 137/625.65; 137/625.27; 251/282

(58) Field of Classification Search .......... 137/625.25, 137/625.26, 625.27, 625.64, 625.65, 625.66, 137/625.69; 251/282
See application file for complete search history.

(56) References Cited

U.S. PATENT DOCUMENTS

| | | | | | |
|---|---|---|---|---|---|
| 1,590,359 | A | * | 6/1926 | Foote | 222/444 |
| 2,342,763 | A | * | 2/1944 | Smith | 251/282 |
| 2,485,192 | A | * | 10/1949 | Eickstaedt | 137/625.27 |
| 2,912,006 | A | * | 11/1959 | Cooksley | 137/625.27 |
| 2,934,090 | A | * | 4/1960 | Kenann et al. | 137/625.5 |
| 3,016,920 | A | * | 1/1962 | Thomsen et al. | 137/625.65 |
| 3,202,182 | A | * | 8/1965 | Haviland | 137/625.27 |
| 3,498,331 | A | * | 3/1970 | Grune | 137/625.66 |
| 3,732,893 | A | * | 5/1973 | Ziesche et al. | 137/625.65 |
| 4,074,700 | A | * | 2/1978 | Engle | 137/625.27 |
| 4,298,027 | A | | 11/1981 | Neff | |
| 4,574,844 | A | | 3/1986 | Neff et al. | |
| 4,641,686 | A | * | 2/1987 | Thompson | 137/625.65 |
| 4,915,134 | A | | 4/1990 | Toliusis et al. | |
| 6,668,861 | B2 | | 12/2003 | Williams | |
| 6,802,298 | B2 | * | 10/2004 | Yoshimura et al. | 123/467 |
| 2003/0213523 | A1 | | 11/2003 | Neff | |

OTHER PUBLICATIONS

European Search Report dated Jan. 17, 2006 (7 pgs).

* cited by examiner

*Primary Examiner*—John Rivell
(74) *Attorney, Agent, or Firm*—Harness, Dickey & Pierce, P.L.C.

(57) ABSTRACT

A fluid control valve includes a valve body having both fluid inlet and discharge ports. A flow passage axially extending within the valve body communicates with the inlet and discharge ports. A valve member within the flow passage is movable by an actuator force in a first direction to direct a pressurized fluid from the inlet to the discharge port. The valve member includes first and second valve heads having different diameters and a valve seating member. The valve seating member engages first and second sealing diameters of the flow passage, the second sealing diameter being smaller than the first. Fluid pressure acting on the different diameters of the first valve head and valve seating member in contact with the second sealing diameter creates a net return force directing the valve member in a second direction opposite to the first direction upon removal of the actuator force.

37 Claims, 8 Drawing Sheets

DIRECTLY OPERATED PNEUMATIC VALVE HAVING A DIFFERENTIAL ASSIST RETURN

FIELD OF THE INVENTION

The present invention relates in general to pneumatic valve assemblies and more specifically to a directly operated pneumatic valve.

BACKGROUND OF THE INVENTION

Directly operated, or actuated, pneumatic valves are well known in the art for controlling the flow of pressurized air therethrough. Directly operated valves may be used alone or in connection with, for example, spool valves and regulators that, in turn, control the flow of pressurized air to and from various pneumatically actuated devices such as press clutches, air brakes, sorting devices or any other pneumatic device or application requiring precise control of operating air. Two-way, three-way, four-way, and five-way direct operated valve assemblies are commonly employed in these environments. Such valves may include a valve body having a flow passage formed in the valve body. A valve member is supported within the flow passage and moveable from one position to another in direct response to an operative force placed on the valve member by an actuator. A plurality of ports are used to connect the valve assembly to a system supply pressure as well as the various active devices that the valve may control. The actuator is typically an electromagnetically operated solenoid that is energized to move the valve member to a predetermined position within the flow passage. A return spring is often employed to bias the valve member back to a known non-energized position. Valves of this type are employed in a wide variety of manufacturing environments where high flow rates and fast response times are desired.

As the technology for these valves has advanced, there has been an increase in the demand for valves designed for operating environments with ever decreasing physical dimensions. In addition, such valves must be able to operate with very fast cycle times. However, in the past, certain design barriers have limited the extent to which the size of the valve assembly could be reduced while at the same time increasing its speed. When the valve member and the flow passage are reduced below a predetermined size, the return spring may be of insufficient physical size and mechanical strength to overcome the inertia of the valve member. In addition, after the valve member has been biased in one direction by the actuator, frictional forces and surface adhesion can build up at the interface of the valve member seals and the flow passage. These frictional forces and related surface adhesion can act to inhibit movement of the valve member in the return direction which reduces valve speed and therefore increases valve response time. If the return spring is unable to provide enough biasing force to quickly or effectively move the valve member from its energized position and return it to the non-energized position when the actuator force is removed, accurate control of the active device is lost. To counter this shortcoming, various design strategies have emerged. However, the design strategies that have been proposed in the related art all suffer from the disadvantage that they add supplemental mechanisms or hardware or require a remote mounting of the valve.

For example, one design strategy proposed in the related art involves the use of dual electromagnetic actuators to move the valve members in opposite directions. Thus, the return spring is replaced by an electromagnetic actuator such as a solenoid. This solution, however, adds the complexity and cost of a second solenoid and its associated parts, and also creates another size limiting boundary. Single electromagnetic actuators that energize in both directions have also been suggested in the related art. However, these single electromagnetic actuators require a bulky double wound actuator as well as additional electronic circuitry and controls, and are therefore typically mounted in a remote location relative to the pneumatically actuated device they control. Remotely located valves defeat the goal of providing valves mounted in very close proximity to the active devices. Such valves must be interconnected via conduits or other flow passages, which require additional hardware and plumbing, and can lower pneumatic efficiencies and introduce line losses within the system.

Directly operated valves having direct mounted solenoid actuators have been developed which provide a portion of bypass flow via a bypass port in the valve member to assist the return spring in overcoming the frictional forces and related surface adhesion. An example of such a valve is provided in U.S. patent application Ser. No. 10/150,291 entitled "DIRECTLY OPERATED PNEUMATIC VALVE HAVING AN AIR ASSIST RETURN", assigned to the assignee of the present invention, the disclosure of which is incorporated herein by reference. This bypass flow design is effective, but requires complex machining of the bypass ports which increases the cost of the valve. A need therefore exists for a further simplified directly operated valve design.

SUMMARY OF THE INVENTION

A directly operated pneumatic valve having a differential assist return of the present invention provides a directly operated valve assembly which eliminates bypass flow ports. More specifically, the directly operated valve assembly includes a valve body having a pressurized air supply inlet port in communication with a source of pressurized air, and at least one cylinder port. A flow passage extends axially within the valve body, and a valve member is moveably supported within the flow passage between predetermined positions to selectively direct pressurized air from the inlet port through the cylinder port. An actuator is mounted to the valve body for directly moving the valve member in a first direction. A biasing member is oppositely disposed from the actuator and positioned between the valve member and the valve body.

The valve member includes heads having differing head diameters which seat against valve seats in the flow passage which also differ in diameter. Fluid pressure acting on differing areas which result from the difference between the head and seat diameters provides several operating conditions. When the valve actuator is de-energized, fluid pressure forces are balanced and the biasing member provides sufficient force to retain the valve member in a closed position. When the valve actuator is energized and the valve member moves from the closed position, pressure forces acting on the differing areas resulting from the different diameters of the valve member result in an unbalanced condition. The unbalanced pressure forces plus the force of the compressed biasing device create a net return force to operatively move the valve member in a direction opposite the movement induced by the actuator when the actuator is de-energized.

The directly operated valve assembly of the present invention has distinct advantages. Air pressure acting over seating areas and flow passages having different diameters creates a differential in forces acting on the valve member. In particular, air pressure acting in one direction on the area of a larger diameter valve member head positioned within a larger first seating area of the flow passage in combination with air pressure simultaneously working in an opposite direction on a smaller diameter valve member head positioned within a smaller second seating area of the flow passage assists the biasing member to operatively move the valve member in a direction opposite to the movement induced by the actuator. Valve operating speed of pneumatic valves of the present invention is approximately equal to valves using only a large return spring or valves having a return spring plus a bypass port. Valve assemblies of the present invention eliminate the need for bypass airflow and therefore the complexity and cost of air assist bypass ports. The self return feature of the biasing member plus the force imbalance created by the geometry of the valve member heads and flow passage seating areas quickly and efficiently move the valve member away from its energized position once the actuator is de-energized. The air-assist self return feature provides the necessary pressure/force to assist in moving the valve to the de-energized position.

The directly operated valve assembly of the present invention offers advantages over conventional valve assemblies when they are significantly reduced in size. A valve assembly of the present invention provides rapid acceleration of the valve member when a biasing member alone is of insufficient physical size and mechanical strength to repeatedly, quickly, and efficiently overcome the inertia of the valve member and/or exceed the frictional adhesion forces acting at the flow passage. This permits very fast acting valve assemblies to be constructed in sizes smaller than the conventional standards and the use of high wattage solenoids or actuators.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
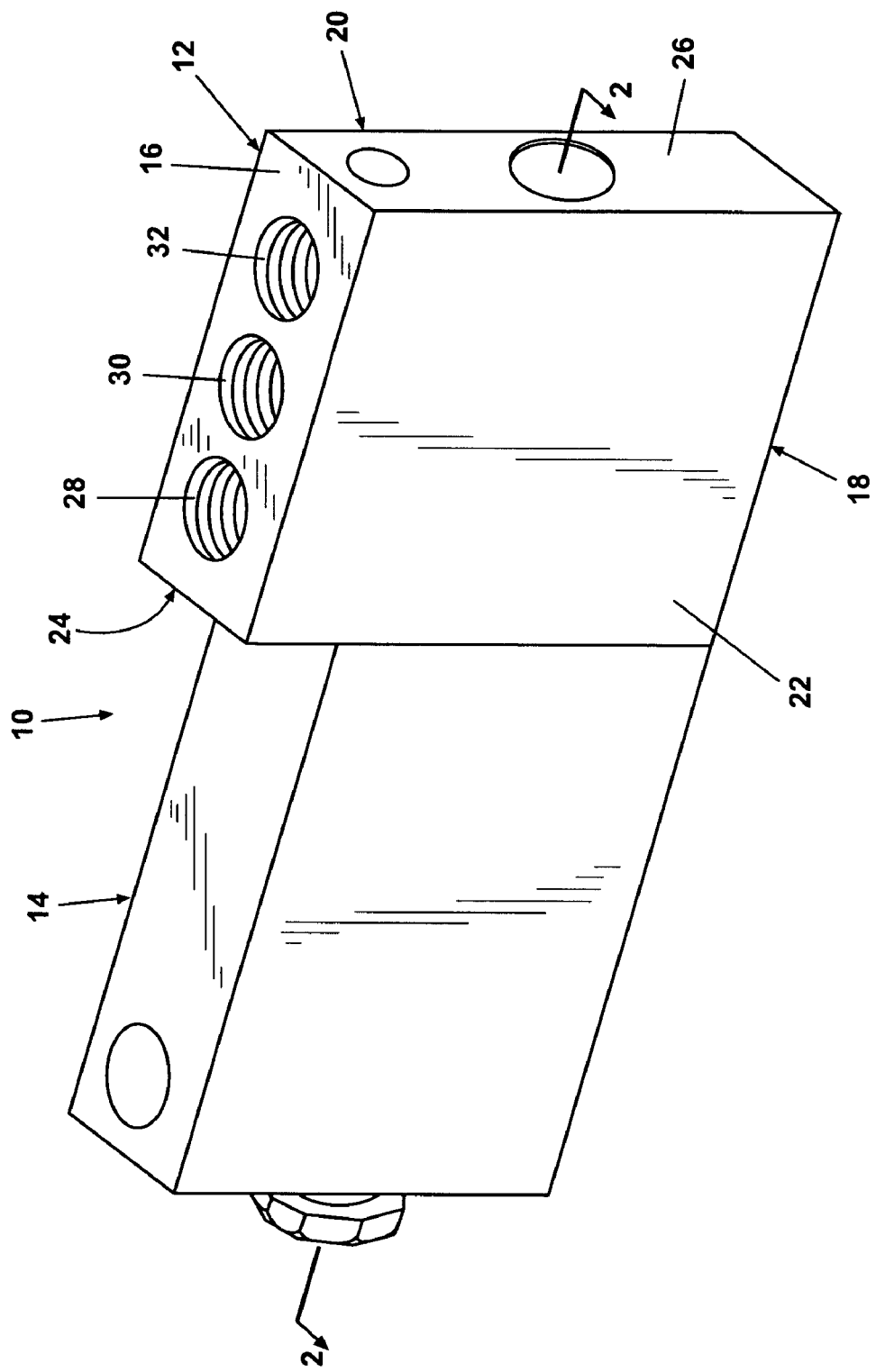
FIG. 1 is a perspective view of a directly operated valve assembly having a self return of the present invention.

Referring now to the figures where like numerals are used to designate like structure throughout the drawings, one embodiment of a directly operated valve assembly of the present invention is generally indicated at 10 in FIG. 1. Valve assembly 10 includes a valve body 12 and an electromagnetic actuator 14 mounted to valve body 12. Valve body 12 has a thin rectangular shape defining top and bottom surfaces 16,18, respectively, a pair of opposed side surfaces 20,22 extending between the top and bottom surfaces 16 and 18, and end surfaces 24,26. In one preferred embodiment, actuator 14 is a solenoid assembly mounted to end surface 24 of valve body 12.

Figure 2:
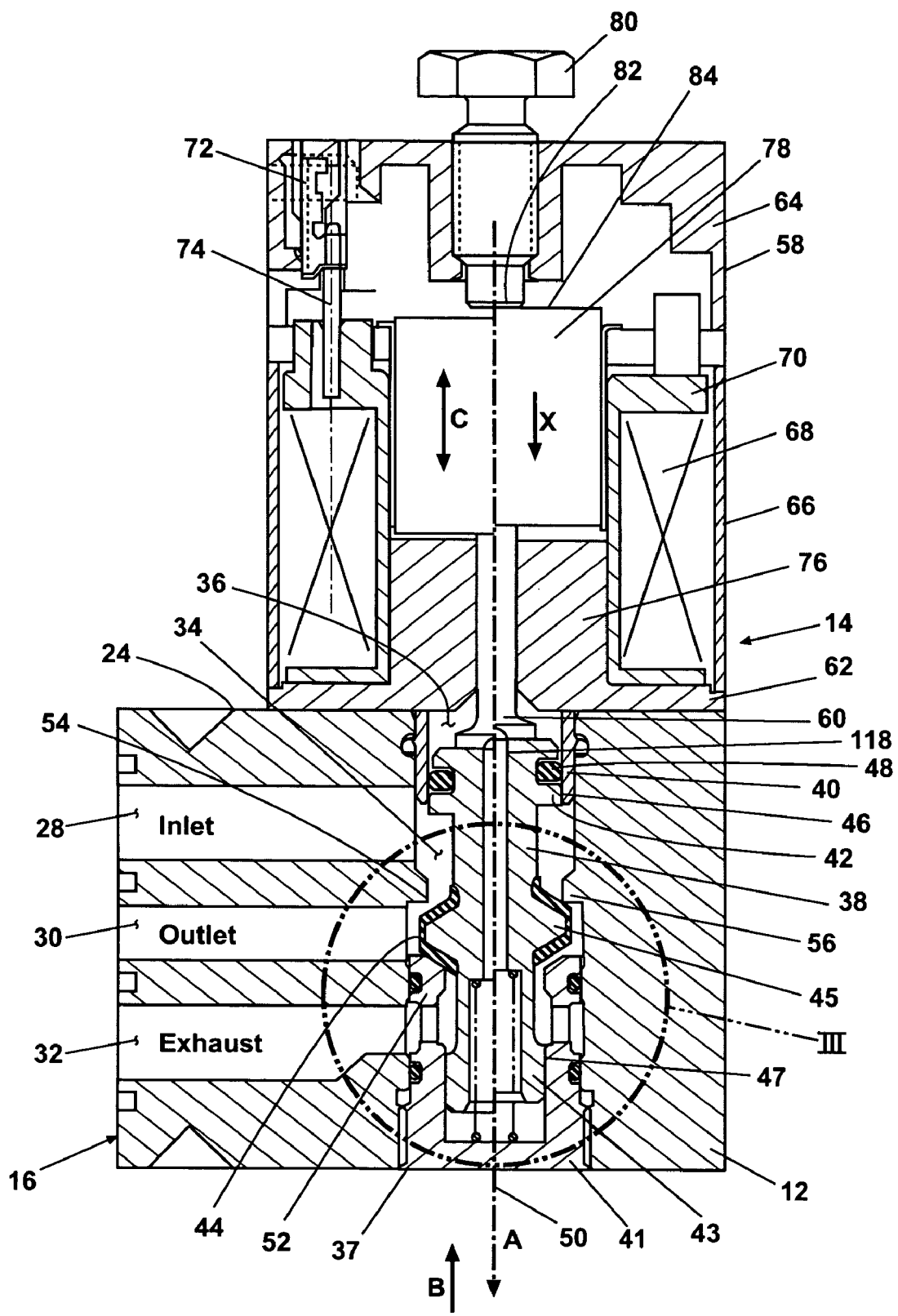
FIG. 2 is a partial cross-sectional side view of the directly operated valve assembly shown in FIG. 1.
Figure 3:
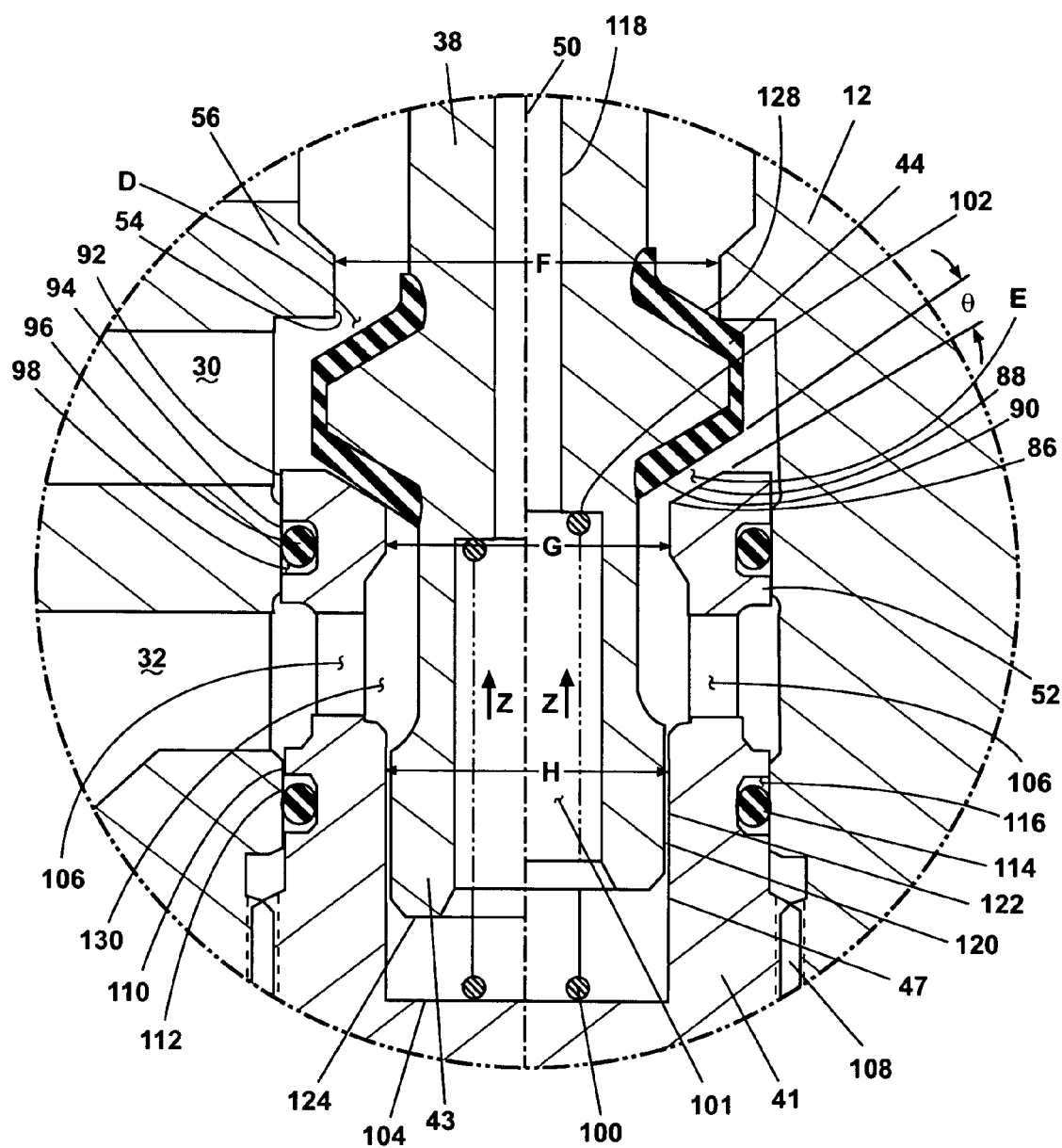
FIG. 3 is a partial, exploded cross-sectional view taken from FIG. 2.

Referring now to FIGS. 2 and 3, valve body 12 includes a pressurized fluid inlet port 28 for communicating with a source of pressurized fluid (not shown), such as air. Valve body 12 further includes at least one discharge port including in one embodiment an outlet port 30 and an exhaust port 32. A valve bore or flow passage 34 extends axially through valve body 12. In the embodiment illustrated in FIGS. 1–3, directly operated valve assembly 10 is a three-way valve and includes inlet port 28, outlet port 30 and exhaust port 32 each in fluid communication with flow passage 34. In this embodiment, each of the inlet port 28, outlet port 30, and exhaust port 32 are formed through top surface 16 of valve body 12 in a "manifold" style. However, those having ordinary skill in the art will appreciate that the various ports may be formed through various, different, surfaces of valve body 12. These ports and passages may be divided between surfaces 16, 18, 20, and/or 22 without departing from the scope of the invention. Inlet port 28, outlet port 30 and exhaust port 32 may also be threaded to accommodate any mechanism necessary to establish fluid communication with another component that is operatively associated with valve assembly 10. To this end, valve body 12 is adapted to be mounted to a manifold, sub-base, or any of a number of various pneumatically actuated devices (not shown).

As shown in FIGS. 2–3, flow passage 34 extends completely through valve body 12 to provide a pair of open ends 36,37. A valve member 38 is slidably moveable between predetermined positions within flow passage 34 to selectively direct pressurized air from inlet port 28 through outlet port 30 and exhaust port 32 as will be described in greater detail below. A first end retainer 40 and a second end retainer 41 are positioned within flow passage 34 to slidably receive valve member 38.

In one preferred embodiment, valve member 38 may be a poppet that is supported within flow passage 34 for reciprocal movement therein to control the flow of fluid through valve body 12. In this embodiment, valve member 38 further includes opposed valve heads, including a first valve head 42 and a second valve head 43 disposed at either end of valve member 38. A valve seating element 44 is positioned on a raised portion 45 of valve member 38 between opposed valve heads 42,43. The position of valve seating element 44 operates to selectively direct either a flow of pressurized air from inlet port 28 through flow passage 34 to outlet port 30 or to direct pressurized fluid from outlet port 30 to exhaust port 32. First end retainer 40 has a first bore 46, and second end retainer 41 has a second bore 47, respectively, that receive first valve head 42 and second valve head 43, respectively, and allow valve member 38 to slidingly move within valve body 12. Portions of first bore 46 and second bore 47 form portions of flow passage 34. A seal member 48 such as an O-ring is positioned between first valve head 42 and first end retainer 40 to provide a fluid seal between inlet port 28 and open end 36. No similar sealing member is required between second valve head 43 and second bore 47 of second end retainer 41.

In one embodiment, poppet valve member 38 is preferably an aluminum insert over-molded at raised portion 45 and bonded with rubber to create valve seating element 44, and ground to specific dimensions to form, for example, first and second valve heads 42,43. However, from the description that follows, those having ordinary skill in the art will appreciate that the present invention is not limited in any way to use in connection with a poppet valve. Rather, the present invention may be employed in connection with any other directly operated valve including, but not limited to, for example, spool valves, flat rubber poppet valves, flapper valves, pilot valves, or valve assemblies employed adjacent to or remote from the pneumatically actuated device.

Each of a solenoid energized and a solenoid de-energized position for valve member 38 are shown in FIG. 2. The solenoid energized position is shown to the left of a longitudinal axis 50 formed through flow passage 34 and the solenoid de-energized position is shown to the right of longitudinal axis 50. To reach the solenoid energized position, valve member 38 travels in the direction of arrow "A" until seating element 44 engages with a terminal end 52 of second end retainer 41. In this position, a flow path is created between inlet port 28 and outlet port 30 via flow passage 34. Flow from inlet port 28 is blocked from entering exhaust port 32 by seating element 44 engaging terminal end 52. To return to the solenoid de-energized position, valve member 38 travels in the direction of arrow "B" until seating element 44 engages with a seating point 54 created at a distal end of an annular valve body extension 56 extending into flow passage 34. In the de-energized position, a flow path is created between outlet port 30 and exhaust port 32 past terminal end 52 to allow pressurized fluid to exhaust via exhaust port 32. In the de-energized position, flow from inlet port 28 is blocked from entering either outlet port 30 or exhaust port 32 by seating element 44 engaging seating point 54.

As best seen in FIG. 2, in one preferred embodiment actuator 14 is an electromagnetic solenoid provided as a solenoid assembly generally including a housing 58 mounted to the end surface 24 of valve body 12. Actuator 14 provides a pushpin 60 which contacts first valve head 42 of valve member 38 to direct valve member 38 in the energized direction of arrow "A". Housing 58 further includes a pole plate 62 positioned adjacent end surface 24, a cap 64 positioned opposite to pole plate 62, and a solenoid can 66. Solenoid can 66 supports a coil 68 of conductive wire, conventionally wrapped around a bobbin 70. The conductive wire is connected to a source of electrical current through one or more lead pins 72. Lead pins 72 are connected to one or more electrical contacts 74 and to wire(s) (not shown) leading to the current source. The direction of the electromagnetic force generated by the current through coil 68 is controllable by a control circuit (not shown).

Pushpin 60 slidably extends through an opening in pole plate 62. Pole plate 62 further includes a ferromagnetic pole piece 76. Pushpin 60 contacts a ferromagnetic armature 78 disposed between solenoid can 66 and cap 64. Armature 78 and pushpin 60 are movable toward pole piece 76 under the influence of an electromagnetic flux generated by a pulse of the current flowing through coil 68 in one direction. This flux produces a driving force in a direction "X" that drives pushpin 60 to move valve member 38 in the solenoid energized direction "A".

A total displacement of armature 78 in the direction of arrows "C" can be controlled in part using an adjustment device 80. In the embodiment shown, adjustment device 80 is threadably joined to cap 64 such that a displaceable end 82 contacts a distal end 84 of armature 78 oppositely positioned from pushpin 60. By adjusting the threaded engagement depth of adjustment device 80, a total travel distance of pushpin 60 and valve member 38 between the de-energized and energized positions is predetermined.

While a particular electromagnetically actuated device has been described herein, actuator 14 employed with the valve assembly of the present invention may be of any known type used for pneumatic valves. It should be further appreciated that although one preferred embodiment of pneumatic valve assembly 10 of the present invention is depicted as a three-way valve, the present invention may be alternately embodied in the form of a two-way, a four-way or the like valve.

As best seen in FIG. 3, when valve member 38 is directed by pushpin 60 to the solenoid energized position, a flowpath "D" is provided between seating point 54 and seating element 44. Motion of valve member 38 continues until seating element 44 engages a sealing contact point 86 created on a sealing edge 88 of terminal end 52. It is desirable to form sealing edge 88 at an angle θ with an engagement face 90 of seating element 44 such that an annular point of contact is formed to create the valve seal. This is shown and described in U.S. Pat. No. 6,668,861 to Williams, issued Dec. 30, 2003, commonly assigned to the assignee of the present invention, the disclosure of which is incorporated herein by reference. In the solenoid energized position, fluid is prevented from bypassing terminal end 52 between an outer perimeter 92 of terminal end 52 and a raised perimeter surface 94 of valve body 12 by a first seal member 96. In one preferred embodiment, first seal member 96 is an elastomeric O-ring. First seal member 96 is retained within a seal groove 98 created in terminal end 52.

A biasing member 100 is positioned within a cavity 101 formed within second valve head 43 and engages both a shelf 102 created within second valve head 43 and a surface 104 of second end retainer 41. Biasing member 100 produces a biasing force depicted as force arrows "Z". The function of biasing member 100 will be described in further detail below. In the embodiment shown, biasing member 100 is a coiled spring, however, those having ordinary skill in the art will appreciate that any biasing mechanism commonly known in the art that is sufficient to provide a force in one direction may be suitable for use in this application. Furthermore, those having ordinary skill in the art will appreciate that, because of the sheer number of suitable biasing members that may be employed in this environment, it is not efficient to attempt to catalog all of them here. Rather, it should be sufficient for purposes of description and illustration to mention that biasing member 100 applies a constant upward force against valve member 38 as viewed in FIGS. 2–5.

In the solenoid de-energized position (partially shown to the right of longitudinal axis 50 as viewed in FIG. 3), a flow path "E" is created between seating element 44 and sealing edge 88. Second end retainer 41 is substantially cup-shaped and includes a plurality of cylinder passages 106 defined in second end retainer 41 and spaced radially relative to one another. Cylinder passages 106 provide fluid communication between flow passage 34 and the respective adjacent ports, for example to permit fluid flow between outlet port 30, via flow path "E", to exhaust port 32. In the solenoid de-energized position, fluid is prevented from escaping from a threaded connection 108 between second end retainer 41 and valve body 12, as well as between an outer perimeter 110 adjacent terminal end 52 and a raised annular surface 112 of valve body 12, by a second seal member 114. Similar to first seal member 96, in one preferred embodiment second seal member 114 is an elastomeric O-ring. Second seal member 114 is retained within a second seal groove 116 positioned in second end retainer 41 between seal groove 98 and threaded connection 108.

FIG. 3 further illustrates that seating point 54 forms a first annular seal having a diameter "F". Sealing contact point 86 of sealing edge 88 forms a second annular seal having a diameter "G". In addition, second bore 47 of second end retainer 41 has a diameter "H". Diameter "G" is substantially equal to diameter "H". Diameter "F" is larger than both diameters "G" and "H" for reasons that will be described in further detail below.

Figure 4:
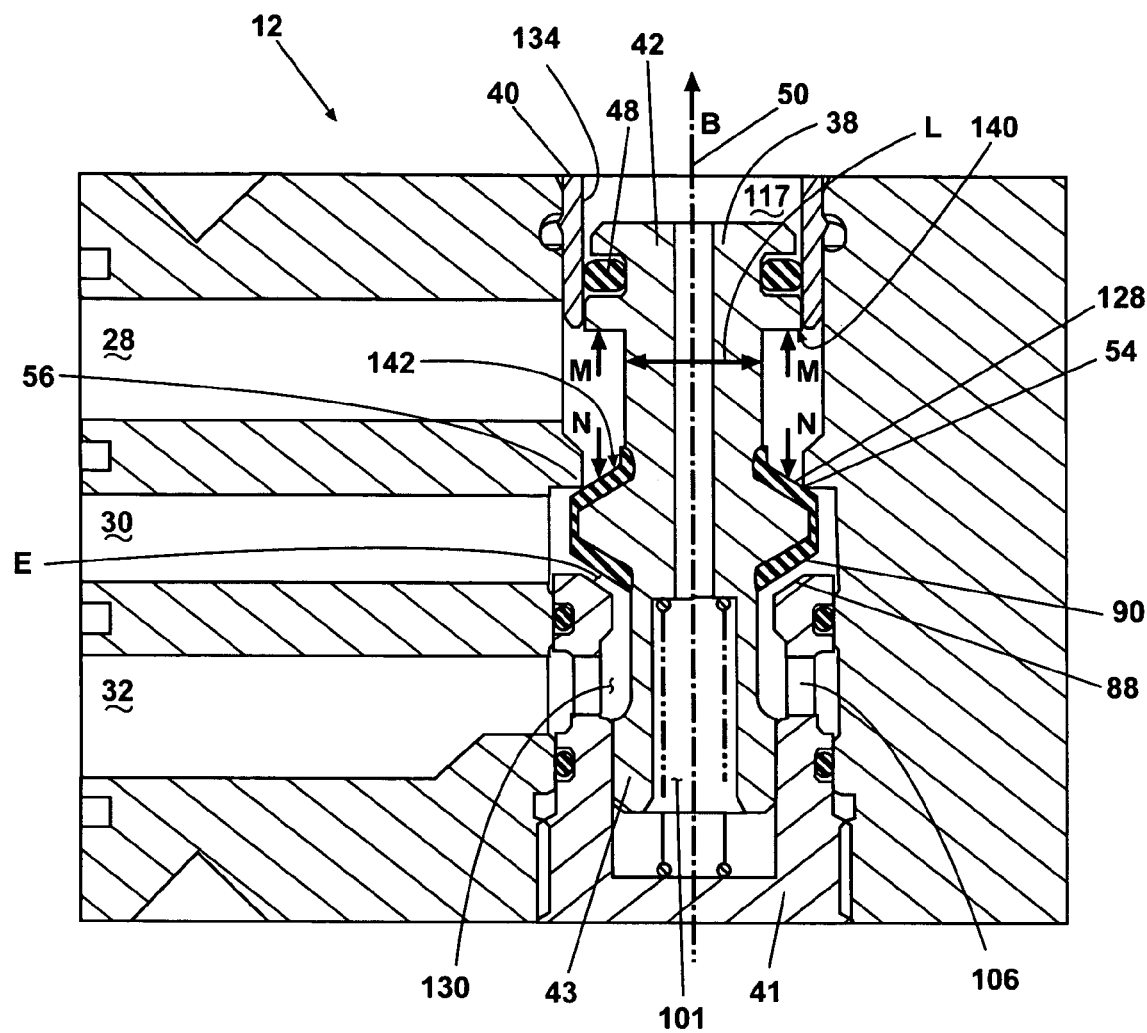
FIG. 4 is a cross-sectional side view of the directly operated valve body portion substantially shown in FIG. 2, illustrating the position of the valve member when the solenoid is de-energized.

Referring to both FIGS. 3 and 4, in order for valve member 38 to travel from the solenoid de-energized to the solenoid energized positions (or in the reverse direction), fluid in cavity 101 or in a second cavity 117 adjacent open end 36 must be displaced. For this purpose, a valve equalization passage 118 (only partially shown in FIG. 3) is provided. In addition, a clearance gap 120 is provided between second bore 47 of second end retainer 41 and a cylindrical outer surface 122 adjacent a distal end 124 of second valve head 43. Fluid is therefore displaced between cavity 101 and either open end 36 or exhaust port 32 via valve equalization passage 118 and/or clearance gap 120 to allow valve member 38 to longitudinally displace within flow passage 34.

FIG. 4 shows the solenoid de-energized position of valve member 38 wherein actuator 14 is de-energized. In this position, flow path "E" is open and a second engagement face 128 of seating element 44 is in contact with seating point 54 of valve body extension 56. Flow path "E" between outlet port 30 and exhaust port 32 remains open until armature 78 is energized. Flow path "E" is open between engagement face 90 of seating element 44 and sealing contact point 86 of sealing edge 88. Flow path "E" also includes a recess 130 created adjacent second valve head 43 of valve member 38. Recess 130 communicates with the plurality of cylinder passages 106 to complete a fluid flow path. To reach the solenoid de-energized position, fluid in second cavity 117 displaces into cavity 101 via valve equalization passage 118 as valve member 38 travels in the direction of arrow "B". Pressurized fluid in inlet port 28 is isolated from both the outlet port 30 and exhaust port 32. Pressurized fluid in inlet port 28 is prevented from leaking into second cavity 117 by seal member 48 as previously discussed.

Figure 5:
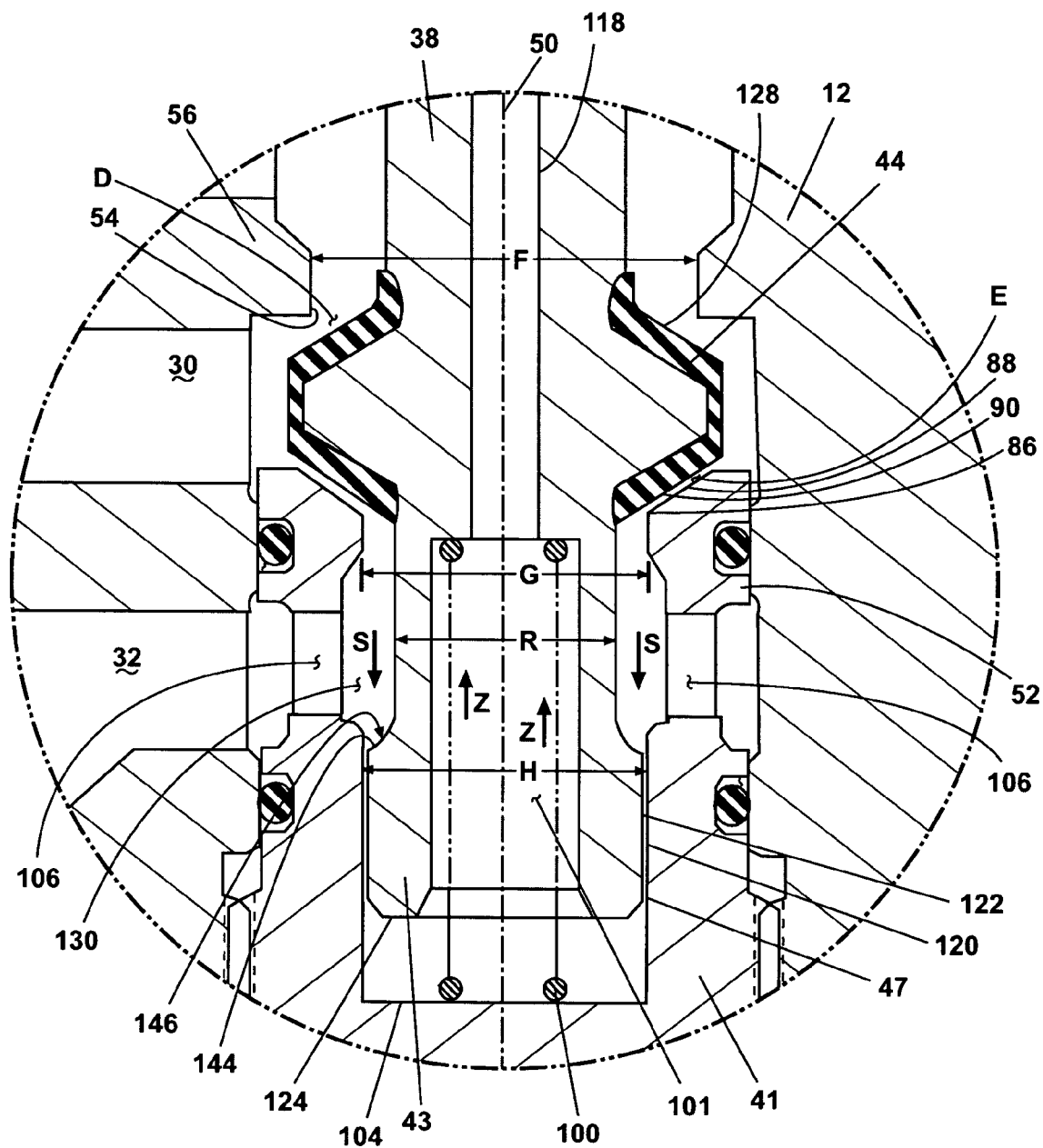
FIG. 5 is a cross-sectional side view similar to FIG. 3, illustrating the valve member positioned between the solenoid energized and de-energized positions.

Referring generally to FIG. 5, an intermediate position of valve member 38 is shown. In the intermediate position, armature 78 has just been energized causing pushpin 60 to begin to reposition valve member 38 such that second engagement face 128 of seating element 44 is no longer in contact with seating point 54 of valve body extension 56. Both flow paths "D" and "E" are open. Engagement face 90 of seating element 44 is not yet in contact with sealing contact point 86 of sealing edge 88. Fluid in cavity 101 displaces into second cavity 117 via valve equalization passage 118.

Figure 6:
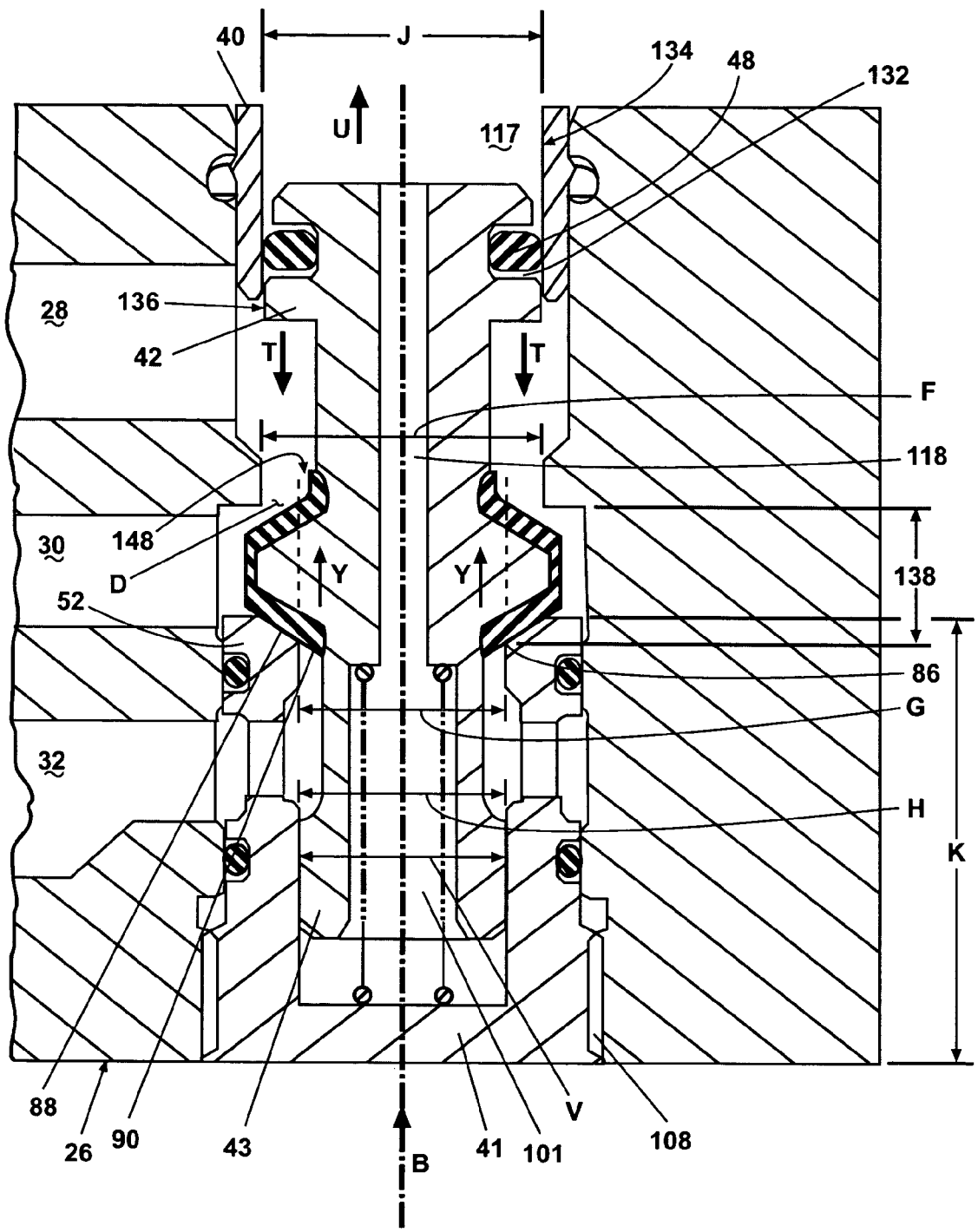
FIG. 6 is a cross-sectional side view of a directly operated valve body portion substantially shown in FIG. 2, illustrating the position of the valve member when the solenoid is energized.

Referring next to FIG. 6, the solenoid energized position of valve member 38 is shown. In this position, flow path "D" is open and engagement face 90 of seating element 44 is in contact with sealing contact point 86 of sealing edge 88, closing flow path "E". Biasing member 100 is compressed by the force provided by armature 78 via pushpin 60. Flow path "D" between inlet port 28 and outlet port 30 remains open until armature 78 is de-energized. Fluid in cavity 101 has displaced into second cavity 117 via valve equalization passage 118. Pressurized fluid in inlet port 28 is prevented from leaking into second cavity 117 by seal member 48 disposed within a third seal groove 132. Seal member 48 forms a seal between an inner cylindrical wall 134 having a bore diameter "J" of first end retainer 40 and an outer perimeter wall 136 of first valve head 42. Bore diameter "J" is substantially equal to diameter "F" of seating point 54.

FIG. 6 also identifies an adjustable feature for second end retainer 41. A depth "K" measured from end surface 26 to the terminal end 52 of second end retainer 41 is controlled by incrementally adjusting threaded connection 108. By controlling depth "K", the position of sealing edge 88 is controlled. A displacement 138 of seating element 44 of valve member 38 between seating point 54 and sealing contact point 86 is thereby controlled, which can be used to vary valve cycle time, total fluid volume discharged from valve assembly 10, etc.

The operation of valve assembly 10 will now be described in reference to the preceding Figures. Referring back to FIG. 4, valve assembly 10 is initially de-energized and valve member 38 is therefore positioned in the de-energized position. Pressurized fluid in inlet port 28 acts on an area 140 in an upward direction of force arrows "M" as viewed in FIG. 4. Area 140 is the remaining area of first valve head 42 after subtracting a diameter "L" of valve member 38 from diameter "J" of first valve head 42 (Area $140=\pi((J-L)/2)^2$). Simultaneously, pressurized fluid in inlet port 28 acts on an effective area 142 in a downward direction of force arrows "N" as viewed in FIG. 4. Area 142 is the remaining area of second engagement face 128 bounded at seating point 54 after subtracting diameter "L" of valve member 38 from diameter "F" (Area $142=\pi((F-L)/2)^2$). Because diameters "J" and "F" are substantially equal, area 140 substantially equals area 142 and balanced forces (M=N) are acting on valve member 38 in this position. Biasing member 100 is therefore necessary, providing a compression force to keep second engagement face 128 in contact with seating point 54 and creating a seal between inlet port 28 and outlet port 30 (as well as exhaust port 32).

Referring generally to FIGS. 2 through 6, when fluid pressure is balanced across valve member 38 in the de-energized position, armature 78 of actuator 14 only has to overcome the biasing force "Z" of biasing member 100 and any friction/adhesion force of seal member 48 to initiate motion of valve member 38. When armature 78 is energized, its force "X" builds until it is sufficient to overcome biasing force "Z" and the friction/adhesion force of seal member 48. Valve member 38 thereafter begins to move. As shown in FIG. 5, after valve member 38 moves a sufficient distance to create a gap (flow path "D") between second engagement face 128 and seating point 54, valve member 38 is no longer "pressure balanced".

As soon as flow path "D" is created, fluid pressure begins to build in recess 130 and against a surface 144 of second valve head 43. An area 146 of surface 144 is the remaining area of second valve head 43 after subtracting diameter "R" of valve member 38 from diameter "H" (Area $146=\pi((H-R)/2)^2$). The clearance gap 120 between second valve head 43 and second bore 47 is ignored for this calculation because of its minimal effect on the resulting force differential. A diameter "V" of second valve head 43 is therefore treated for purposes of this analysis as substantially equal to diameter "H". A resulting force "S" acts on area 146 which is oppositely directed but less than force "M", because diameter "J" is larger than diameters "H" or "V" (area 140>area 146). A pressure imbalance (M−S) is therefore created which is oppositely directed from solenoid force "X". However, because valve member 38 is already in motion at this time and solenoid force "X" is continuing to build as armature 78 approaches pole piece 76, valve member 38 rapidly accelerates.

In the intermediate position shown in FIG. 5, both flow paths "D" and "E" are open. Fluid pressure forces acting on seating element 44 are assumed to be substantially balanced. Minor differential pressure effects of fluid flow through the outlet and exhaust ports 30,32 are ignored.

Referring now to both FIGS. 3 and 6, when engagement face 90 of seating element 44 contacts sealing contact point 86, solenoid force "X" and the momentum of valve member 38 compress engagement face 90 against sealing contact point 86 and a portion of sealing edge 88. Due to the seating area clearance provided by angle θ (FIG. 3), pressure acts on only a portion of engagement face 90. In this position, a net or resultant force "T" is created which opposes fluid force "M". Force "T" results from pressure acting on engagement face 90 of seating element 44 over an area 148. Area 148 is the remaining area of seating element 44 bounded at the extension of sealing contact point 86 after subtracting diameter "L" of valve member 38 from diameter "G" (Area $148=\pi((G-L)/2)^2$). A net return force "U" tending to return valve member 38 in an upward direction (opposing solenoid force "X") results from the difference between force "M" and force "T" (U=(M−T)). When a combination of the compressive resistance of sealing edge 88 at sealing contact point 86, the biasing force of biasing member 100 and the net return force "U" are equal to the solenoid force "X", motion of valve member 38 stops. This produces the energized position of valve assembly 10. Pressure at the inlet port 28 and at the outlet port 30 is now blocked from the exhaust port 32.

At this time, three forces exist which are available to quickly return valve member 38 to the de-energized position. First, biasing member 100 is compressed, further increasing biasing force "Z". Second, a compressive force "Y" is temporarily generated when seating element 44 compresses against sealing contact point 86 and sealing edge 88. Third, net return force "U" acts to return valve member 38 in the de-energized return direction of arrow "B".

When armature 78 is thereafter de-energized, valve member 38 begins to move quickly because of the above three forces. Valve member 38 stops when second engagement face 128 abuts and compresses against seating point 54. Because diameter "F" and diameter "J" are equal, the pressure balanced condition for valve member 38 is restored and valve member 38 stops moving when the compressive resistance of second engagement face 128 is equal to biasing force "Z" of biasing member 100. Pressure in output port 30 is thereafter dissipated through exhaust port 32 via flow path "E" or through an open output port 30.

Figure 7:
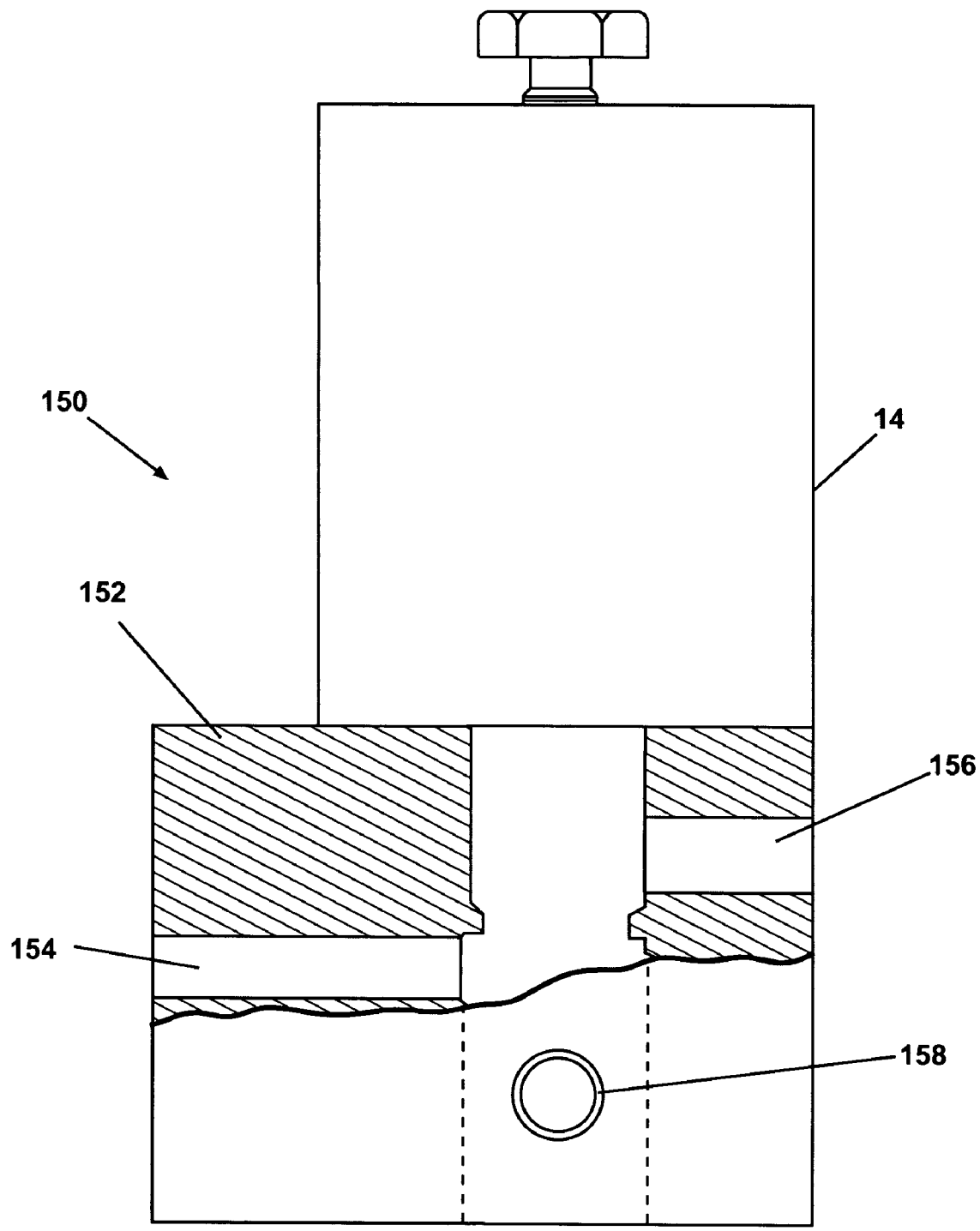
FIG. 7 is a partial cross sectional, side elevational view of another preferred embodiment of a directly operated valve assembly of the present invention.

FIG. 7 identifies another embodiment of the present invention having port positions differing from those shown in FIG. 2. FIG. 7 represents one of a plurality of alternate configurations for valve ports of the present invention. In FIG. 7, a valve assembly 150 includes a valve body 152 having an actuator 14 mounted thereon. An outlet port 154 similar to outlet port 30 is positioned toward the left similar to that shown in FIG. 2. An inlet port 156 is positioned to the right as viewed in FIG. 6 or opposite to inlet port 28 shown in FIG. 2. An exhaust port 158 is directed toward the viewer as viewed in FIG. 7. Valve member 38 is not shown for clarity.

Figure 8:
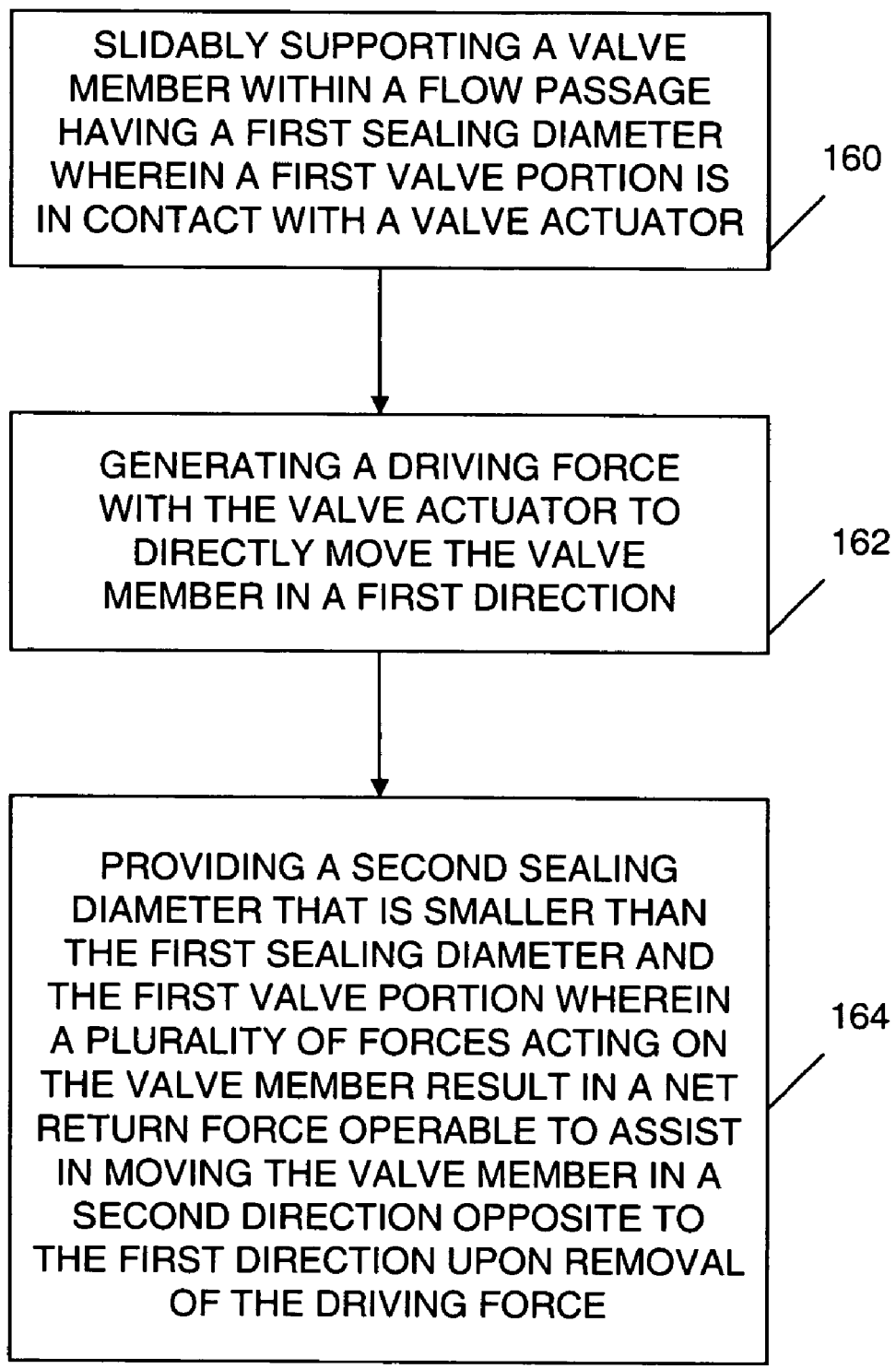
FIG. 8 is a diagram of the method steps for operating a directly operated valve assembly having a differential assist of the present invention.

Referring to FIG. 8, a method for operating a valve assembly of the present invention includes the steps of: slidably supporting a valve member within a flow passage having a first sealing diameter wherein a first valve portion is in contact with a valve actuator (160); generating a driving force with the valve actuator to directly move the valve member in a first direction (162); and providing a second sealing diameter that is smaller than the first sealing diameter and the first valve portion wherein a plurality of forces acting on the valve member result in a net return force operable to assist in moving the valve member in a second direction opposite to the first direction upon removal of the driving force (164).

In one preferred embodiment of the valve of the present invention, materials are as follows. Valve body 12 is constructed of die cast aluminum. Valve member 38 is a metal such as aluminum. First end retainer 40 is a low friction polymeric material such as DELRIN®. Second end retainer 41, which provides a sliding fit but is not relied on for a sliding seal, is a brass material. Valve seating element 44 is a rubber or rubber-like material such as Buna-N having a durometer of approximately 80 to 90. Biasing member 100 is a spring steel. These materials are exemplary only, as the materials identified do not limit the invention or its uses.

The operation of a valve of the present invention is described with reference to inlet fluid pressure acting on the valve member and sealing diameters. In addition to the forces and flow paths described herein, a portion of the valve inlet pressure can also partially dissipate via the outlet and/or exhaust ports as the valve member repositions, and a minor backpressure can be created. Backpressures and/or forces of the fluid within cavity 101 acting against shelf 102, and externally acting against distal end 124 as fluid transfers via valve equalization passage 118 are considered negligible.

A directly operated pneumatic valve having a differential assist return of the present invention offers several advantages. A pressure balanced condition of the valve assembly exists when the valve actuator is de-energized. This means less force is required by the valve actuator to initiate valve member travel and the valve member can be accelerated very rapidly. When the valve actuator is energized and the valve member is positioned to permit flow, an imbalanced pressure condition is present. The pressure imbalance acting on different areas of the valve member is created by having differing valve member head areas which engage valve sealing areas of differing areas. The imbalanced pressure acts to accelerate the valve member more quickly when the actuator is de-energized. A valve assembly of the present invention eliminates the need for a valve bypass port which reduces the valve cost.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve for controlling a pressurized fluid, comprising:
a valve body including a fluid inlet port, at least one fluid discharge port and a flow passage in communication with both the inlet port and the discharge port, the flow passage defining first and second annular seating points axially spaced on a longitudinal axis of the flow passage, the first seating point having a first sealing diameter and the second seating point having a second sealing diameter smaller than the first sealing diameter;
a valve member having first and second valve portions being slidably positionable within the flow passage, the first valve portion having a first portion diameter defining a first portion area and the second valve portion having a second portion diameter defining a second portion area smaller than the first portion area;
a seating portion of the valve member positionable to abut the first seating point in a first position and to abut the second seating point in a second position, wherein a fluid exposed area of the seating portion is defined where the valve member is in the second position;
wherein the valve member is movable from the first position to the second position by a driving force applied in a first direction and in the second position the pressurized fluid acting on both the first portion area and the fluid exposed area creates a net return force operable to direct the valve member in a second direction opposite to the first direction upon cessation of the driving force.

2. The valve of claim 1, further comprising a biasing member positionable between the valve member and the valve body adapted to bias the valve member in the second direction and opposite to the first direction.

3. The valve of claim 1, further comprising:
a biasing force operably created by the biasing member;
wherein a sum of the biasing force and the net return force is less than the driving force.

4. The valve of claim 1, wherein the at least one discharge port further comprises both an outlet port and an exhaust port.

5. The valve of claim 4, comprising a first flow path open between the outlet port and the exhaust port operably created in the first position, wherein the inlet port is isolated from both the outlet port and the exhaust port.

6. The valve of claim 5, comprising a second flow path open between the inlet port and the outlet port in the second position, wherein the exhaust port is isolated from both the inlet port and the outlet port.

7. The valve of claim 1, further comprising an adjustment device operable to incrementally adjust a displacement of the valve member between the first position and the second position.

8. The valve of claim 1, further comprising:
a first end retainer positionable within the flow passage; and
a second end retainer positionable within the flow passage;
wherein both the first and second end retainers are operable to slidably support the valve member.

9. The valve of claim 8, wherein the second end retainer comprises a threaded connection adapted to releasably join the second end retainer to the valve body.

10. The valve of claim 9, wherein the second sealing diameter is operably created on the second end retainer and is positionable within the flow passage using the threaded connection.

11. The valve of claim 1, wherein the seating element is positioned between the first and second sealing diameters.

12. The valve of claim 1, wherein the first sealing diameter comprises a valve body extension annularly extended within the flow passage.

13. The valve of claim 1, wherein the first portion diameter is substantially equal to the first sealing diameter.

14. The valve of claim 1, wherein the second portion diameter is substantially equal to the second sealing diameter.

15. A directly operated valve assembly, comprising:
a valve body including a fluid inlet port, at least one fluid discharge port and a flow passage in communication with both the inlet port and the discharge port, the flow passage having a first sealing diameter and a second sealing diameter smaller than the first sealing diameter;
a valve member having first and second valve heads being slidably positionable within the flow passage, the first valve head having a first head diameter and the second valve head having a second head diameter smaller than the first head diameter;
a seating element disposed on the valve member adaptable to seal in a first position abutting the first sealing diameter and a second position abutting the second sealing diameter; and
an actuator directly mounted to the valve body operable to generate a driving force to move the valve member in a first direction;
wherein in the second position the pressurized fluid acting on a difference in area determined between the first head diameter and the second sealing diameter creates a net return force operable to direct the valve member in a second direction opposite to the first direction upon cessation of the driving force.

16. The valve assembly of claim 15, wherein the actuator further comprises a solenoid having an armature.

17. The valve assembly of claim 16, wherein the actuator further comprises a pushpin in direct contact between the valve member and the armature operable to directly move the valve member in the first direction.

18. The valve assembly of claim 15, wherein the actuator further comprises an adjustment device adapted to limit a displacement of the armature and thereby the valve member.

19. The valve assembly of claim 15, further comprising a biasing member positionable between the valve member and the valve body adapted to bias the valve member in the second direction.

20. The valve assembly of claim 15, wherein the at least one fluid discharge port further comprises both an outlet port and an exhaust port.

21. The valve assembly of claim 20, further comprising:
a first flow path open between the outlet port and the exhaust port operably created in the first position, wherein the inlet port is isolated from both the outlet port and the exhaust port; and
a second flow path open between the inlet port and the outlet port in the second position, wherein the exhaust port is isolated from both the inlet port and the outlet port.

22. The valve assembly of claim 21, further comprising:
a valve seating element disposed on the valve member and positionable between the first and second sealing diameters; and
a valve body extension defining the first sealing diameter, the body extension adapted to matably receive the valve seating element in the first position;

wherein the valve seating element contacts the second sealing diameter in the second position.

23. The valve assembly of claim 15, further comprising an end retainer positionable within the flow passage and adapted to slidably receive the second valve head.

24. The valve assembly of claim 23, wherein the end retainer further comprises:
   a threaded connection adapted to engage the valve body;
   wherein the second sealing diameter is operably created within the end retainer and a location of the second sealing diameter is incrementably positionable within the flow passage using the threaded connection.

25. A directly operated valve assembly, comprising:
   a valve body including a fluid inlet port, at least one fluid discharge port and a flow passage in communication with both the inlet port and the discharge port, the flow passage having a first sealing diameter and a second sealing diameter smaller than the first sealing diameter;
   a valve member having first and second valve heads being slidably positionable within the flow passage, the first valve head having a first head diameter and the second valve head having a second head diameter smaller than the first head diameter;
   a seating element disposed on the valve member adaptable to seal in a first position abutting the first sealing diameter and a second position abutting the second sealing diameter;
   an actuator directly mounted to the valve body operable to generate a driving force to move the valve member in a first direction; and
   a biasing member positionable between the valve member and the valve body adapted to bias the valve member in a second direction opposite to the first direction;
   wherein in the second position the pressurized fluid acting on a difference in area between the first head diameter and the second sealing diameter creates a net return force which together with a biasing force of the biasing member are operable to direct the valve member in a second direction opposite to the first direction upon cessation of the driving force.

26. The valve assembly of claim 25, wherein the solenoid actuator further comprises a pushpin in direct contact with the valve member.

27. The valve assembly of claim 25, further comprising:
   a sealing groove created in the first valve head; and
   a sealing member disposed in the sealing groove operable to create a fluid seal between the first valve head and the flow passage.

28. The valve assembly of claim 27, further comprising a first retainer disposed between the first valve head and the flow passage, the first retainer in sliding contact with the sealing member.

29. The valve assembly of claim 28, wherein the first retainer further comprises a polymeric material.

30. The valve assembly of claim 28, further comprising a second retainer disposed between the second valve head and the flow passage.

31. The valve assembly of claim 30, wherein the second retainer comprises:
   a metal material;
   wherein the second retainer is threadably adapted to join the second retainer to the valve body.

32. A method for controlling the functions of a directly operated valve assembly, the valve assembly having a valve actuator directly connected to a valve body, a flow passage axially extending within the valve body, a valve member including a first valve portion, the flow passage having a first sealing diameter and a second sealing diameter; the method comprising:
   slidably supporting the valve member within the flow passage wherein the first valve portion contacts the valve actuator;
   generating a driving force with the valve actuator to directly move the valve member in a first direction; and
   providing the second sealing diameter smaller than the first sealing diameter and the first valve portion wherein a plurality of forces acting on the valve member to result in a net return force operable to assist in moving the valve member in a second direction opposite to the first direction upon removal of the driving force.

33. The method of claim 32, further comprising biasing the valve member in the second direction.

34. The method of claim 32, further comprising slidably sealing the first valve head within the flow passage.

35. The method of claim 32, further comprising radially extending a sealing member from the valve member to position the first sealing diameter.

36. The method of claim 35, further comprising positioning the sealing member between each of the first and second sealing diameters wherein contact between the sealing member and the first seating diameter creates a first valve member position and contact between the sealing member and the second sealing diameter creates a second valve member position.

37. The method of claim 32, further comprising creating a second valve head having a diameter smaller than the first valve head such that a differential force is created between the first and second valve heads by a pressure acting on both the valve heads.

* * * * *